US012623330B2

(12) United States Patent
Iseda et al.

(10) Patent No.: US 12,623,330 B2
(45) Date of Patent: May 12, 2026

(54) WORKING MACHINE

(71) Applicant: Koki Holdings Co., Ltd., Tokyo (JP)

(72) Inventors: Keigo Iseda, Ibaraki (JP); Ken Inui, Ibaraki (JP); Shota Hirano, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 18/715,501

(22) PCT Filed: Dec. 2, 2022

(86) PCT No.: PCT/JP2022/044625
§ 371 (c)(1),
(2) Date: May 31, 2024

(87) PCT Pub. No.: WO2023/101022
PCT Pub. Date: Jun. 8, 2023

(65) Prior Publication Data
US 2025/0033180 A1     Jan. 30, 2025

(30) Foreign Application Priority Data

| Dec. 3, 2021 | (JP) | 2021-197267 |
| Jul. 20, 2022 | (JP) | 2022-115659 |
| Jul. 29, 2022 | (JP) | 2022-121261 |

(51) Int. Cl.
B25F 5/00 (2006.01)
B23D 49/16 (2006.01)

(52) U.S. Cl.
CPC ............ B25F 5/006 (2013.01); B23D 49/162 (2013.01)

(58) Field of Classification Search
CPC ............ B25F 5/001; B25F 5/00; B25F 5/006; B24B 23/04; B23D 51/161; B23D 51/16; B23D 9/16
See application file for complete search history.

(56) References Cited

U.S. PATENT DOCUMENTS

| 7,866,411 B2 * | 1/2011 | Rondahl | B23D 51/16 |
| | | | 173/162.2 |
| 8,141,444 B2 * | 3/2012 | Lagaly | B23D 51/02 |
| | | | 74/44 |

(Continued)

FOREIGN PATENT DOCUMENTS

| GB | 2042973 | * 10/1980 | B23D 51/16 |
| JP | H11005201 A | 1/1999 | |

(Continued)

OTHER PUBLICATIONS

International Search Report received in the PCT Application No. PCT/JP2022/044625, dated Feb. 21, 2023, w/ English Translation.

(Continued)

*Primary Examiner* — Gloria R Weeks
(74) *Attorney, Agent, or Firm* — Rimon P.C.

(57)     ABSTRACT

Provided is a working machine in which a counterweight is appropriately supported, thereby avoiding deterioration of workability. The working machine includes: a motor; a plunger reciprocated in a front-back direction by a drive of the motor; a crankshaft rotated around an axis extending in an up-down direction by the drive of the motor; a counterweight driven in a front-back direction by rotation of the crankshaft so as to cancel out vibration due to the reciprocation of the plunger; a transmission mechanism (gear, crankshaft, and connector) converting a rotation driving force of the motor into a driving force for the plunger and counterweight and transmitting the driving force to the plunger and counterweight; and a gear case (transmission mechanism accommodation portion and lid portion) accommodating the transmission mechanism and elastically supporting the counterweight in the right-left direction.

20 Claims, 5 Drawing Sheets

(56)     References Cited

U.S. PATENT DOCUMENTS

| | | | | |
|---|---|---|---|---|
| 8,225,776 | B2 * | 7/2012 | Kawamura | B27B 17/00 |
| | | | | 123/635 |
| 8,407,902 | B2 * | 4/2013 | Naughton | B23D 49/162 |
| | | | | 30/392 |
| 9,573,207 | B2 * | 2/2017 | Sugita | B23D 51/16 |
| 10,850,338 | B2 * | 12/2020 | Zheng | B25F 5/006 |
| 10,960,474 | B2 * | 3/2021 | Wang | B25D 17/24 |
| 2008/0029282 | A1 * | 2/2008 | Ikuta | F16F 7/1005 |
| | | | | 30/392 |
| 2008/0277128 | A1 * | 11/2008 | Satou | B25F 5/006 |
| | | | | 173/48 |
| 2014/0331506 | A1 * | 11/2014 | Sugita | B23D 49/16 |
| | | | | 30/392 |
| 2015/0367494 | A1 * | 12/2015 | Wang | B25F 5/006 |
| | | | | 74/25 |
| 2019/0128392 | A1 * | 5/2019 | McLain | F16H 25/18 |
| 2020/0070265 | A1 * | 3/2020 | Wang | B25D 17/24 |

FOREIGN PATENT DOCUMENTS

| | | | | | |
|---|---|---|---|---|---|
| JP | 2006-175524 | A | | 7/2006 | |
| JP | 2011-115912 | A | | 6/2011 | |
| JP | 2018-062023 | A | | 4/2018 | |
| WO | 2017/104380 | A1 | | 6/2017 | |
| WO | WO 2021041805 | | * | 3/2021 | B23D 51/16 |

OTHER PUBLICATIONS

Extended European Search Report dated Nov. 3, 2025, issued in corresponding EP Application No. 22901452.7.

* cited by examiner

WORKING MACHINE

CROSS REFERENCE TO RELATED APPLICATIONS

This application is the U.S. National Phase under 35 U.S.C. § 371 of International Application No. PCT/JP2022/044625, filed on Dec. 2, 2022, which claims the benefit of Japanese Application Nos. 2021-197267, filed on Dec. 3, 2021, 2022-115659, filed on Jul. 20, 2022, and 2022-121261, filed on Jul. 29, 2022, and the entire contents of each are hereby incorporated by reference.

TECHNICAL FIELD

The present invention relates to a working machine.

BACKGROUND ART

Patent Document 1 discloses a saber saw (reciprocating saw) as a working machine. In this working machine, a motor drives a plunger to reciprocate in a front-back direction, and a blade provided at a tip of the plunger reciprocates to cut an object.

RELATED ART DOCUMENTS

Patent Documents

Patent Document 1: International Publication No. WO2017/104380

SUMMARY OF THE INVENTION

Problems to be Solved by the Invention

In a working machine disclosed in Patent Document 1, a counterweight is operated to reduce vibration in a front-back direction, but an operation of the counterweight generates other vibrations and noise, which may hinder workability.

In view of the above problems, an object of the present invention is to provide a working machine in which workability is not impaired by appropriately supporting the counterweight.

Means for Solving the Problems

A working machine of one embodiment includes: a motor; a plunger that reciprocates in a front-back direction by a drive of the motor; a rotating body that rotates around a shaft extending in an up-down direction by the drive of the motor; a counterweight that reciprocates in the front-back direction so as to cancel out vibration due to the reciprocation of the plunger by the rotation of the rotating body; a transmission mechanism that transmits a rotation driving force of the motor to the plunger and the counterweight; and an elastic transmission machine that elastically supports the counterweight in a right-left direction.

Effects of the Invention

In the working machine according to one embodiment, the vibration due to the operation of the counterweight is suppressed by the elastic body, so that workability is not impaired.

DETAILED DESCRIPTION OF PREFERRED EMBODIMENTS

Figure 1:
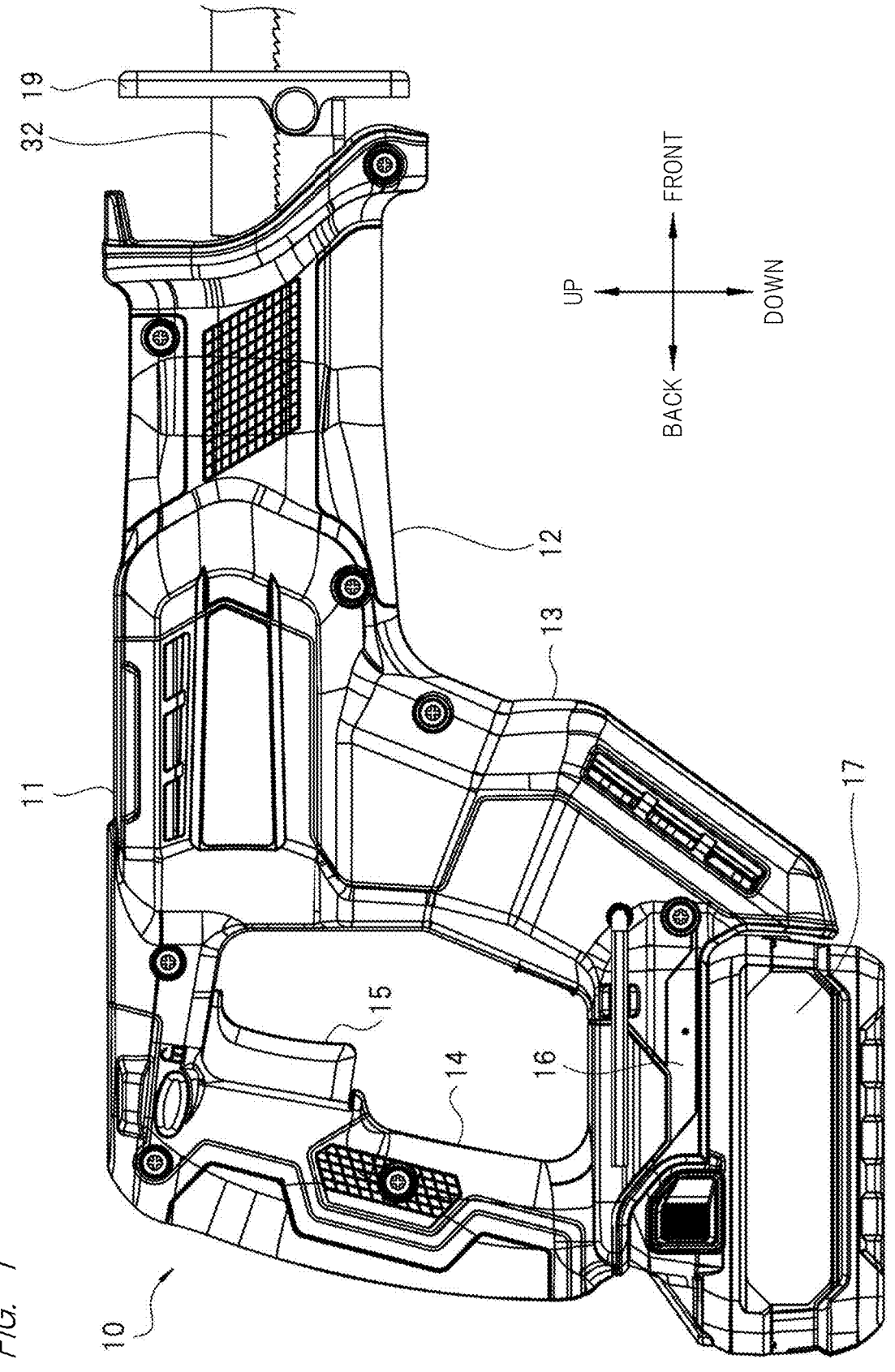
FIG. 1 is a left-side view of a working machine according to one embodiment.
Figure 2:
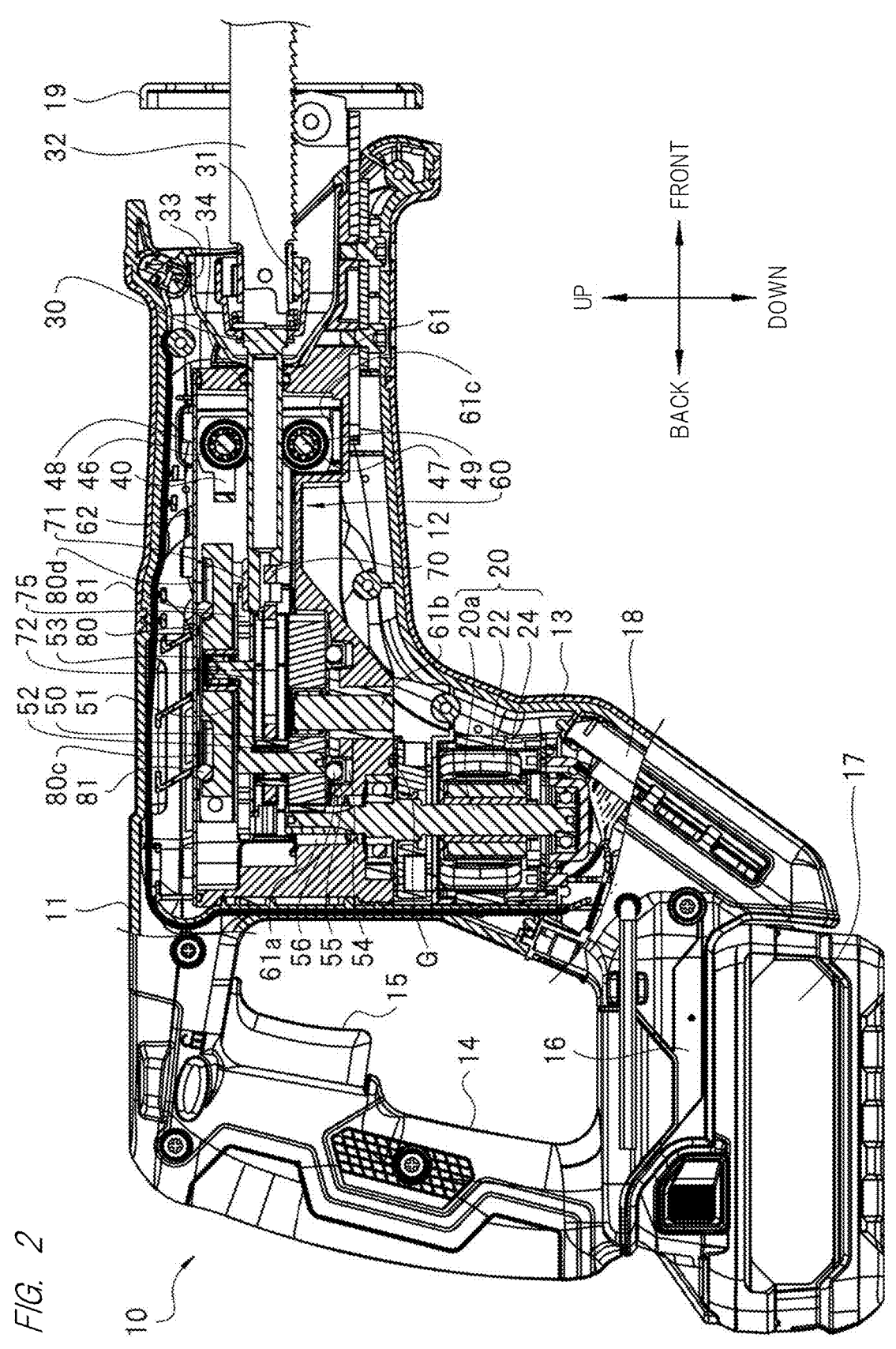
FIG. 2 is a partial cross-section left-side view of the working machine.

Hereinafter, a working machine according to one embodiment of the present invention will be described with reference to the drawings. In FIGS. 1 and 2, a front-back direction and an up-down direction are directions indicated in the figures. Further, a direction orthogonal to the front-back direction and the up-down direction (that is, a direction perpendicular to a plane of paper) is referred to as a right-left direction. The front-back direction is one example of a first direction. The up-down direction and the right-left direction are one example of a second direction. The second direction is a direction orthogonal to the first direction.

In the working machine 10, as shown FIG. 2, a plunger 30 reciprocates in the front-back direction by driving a motor 20. The working machine 10 according to the present embodiment is a saber saw (reciprocating saw), a blade 32 is attached on a front side of the plunger 30, and the blade 32 reciprocates in the front-back direction to cut an object. First, with reference to FIGS. 1 and 3, an outline of the working machine 10 will be described.

As shown in FIG. 1, the working machine 10 includes a housing 11 configured by metal and a synthetic resin. The housing 11 can be divided into two in the right-left direction. The housing 11 is provided with a plunger accommodation portion 12, a motor accommodation portion 13, a handle 14, a trigger 15, an attachment portion 16, a base 19, and the like.

The plunger accommodation portion 12 is formed into a cylinder shape extending in the front-back direction. The motor accommodation portion 13 is formed into a cylinder shape extending downwardly from a lower portion of the plunger accommodation portion 12. The handle 14 is formed into a shape extending downwardly from a back portion the plunger accommodation portion 12. The handle 14 is provided with the trigger 15. By an operator, the handle is grasped, and the trigger is operated.

The attachment portion 16 is provided below the motor accommodation portion 13 and the handle 14. A battery pack 17 is attached to the attachment portion 16. The battery pack 17 supplies power to the motor 20. A controller 18 is provided inside the motor accommodation portion 13 (see FIG. 2).

When the operator operates the trigger 15, a trigger switch detects the operation of the trigger 15 and a trigger operation signal is transmitted from the trigger switch to a controller 18. The controller 18 performs control for activating the motor 20 upon receiving the trigger operation signal.

The base 19 is provided in front of the plunger accommodation portion 12. The blade 32 passes through the base 19. The base 19 is movable in the front-back direction with respect to the plunger accommodation portion 12 and tiltable. A position and an angle of the base 19 are adjusted by moving or tilting the base 19 according to the object. The blade 32 can be smoothly reciprocated by performing a cutting operation(s) while the base 19 whose position and angle are adjusted is pressed against the object.

As shown in FIG. 2, a gear case 60 is provided inside the plunger accommodation portion 12. The gear case 60 is configured by a transmission mechanism accommodation portion 61 on a lower side and a lid portion 62 on an upper side.

The transmission mechanism accommodation portion 61 extends in the front-back direction, is closed on a lower side, and is open on an upon side. The transmission mechanism accommodation portion 61 is made of metal. A motor shaft hole 61a extending in the up-down direction is formed in a back portion of the transmission mechanism accommodation portion 61. A center shaft 61b extending in the up-down direction is provided in a center portion of the transmission mechanism accommodation portion 61. An abutment surface 61c extending in the front-back direction is formed in a front portion of the transmission mechanism accommodation portion 61.

The lid portion 62 has a thin plate shape extending in the front-back direction. The lid portion 62 is made of metal. Therefore, the lid portion 62 has flexibility. The lid portion 62 closes an opening of the transmission mechanism accommodation portion 61.

The gear case 60 accommodates the plunger 30. The plunger 30 has a cylindrical shape extending in the front-back direction. The plunger 30 is made of metal. The plunger 30 is supported by a first roller 46 and a second roller 47, and is reciprocable in the front-back direction.

The first roller 46 is one example of a first support portion. The first support portion is arranged on one side of the plunger 30 in an orthogonal direction orthogonal to the front-back direction. The first roller 46 of this embodiment is arranged on the upper side of the plunger 30. The first roller 46 is made of a resin.

The second roller 47 is one example of a second support portion. The second support portion is arranged on the other side of the plunger 30 in the orthogonal direction orthogonal to the front-back direction. The second roller 47 of this embodiment is arranged on the lower side of the plunger 30. The second roller 47 is made of a resin.

The first roller 46 is rotatably supported by a first shaft 48. The second roller 47 is rotatably supported by a second shaft 49. The first shaft 48 and the second shaft 49 are made of metal. The first shaft 48 and the second shaft 49 are non-rotatably supported by the holder 40.

Figure 3:
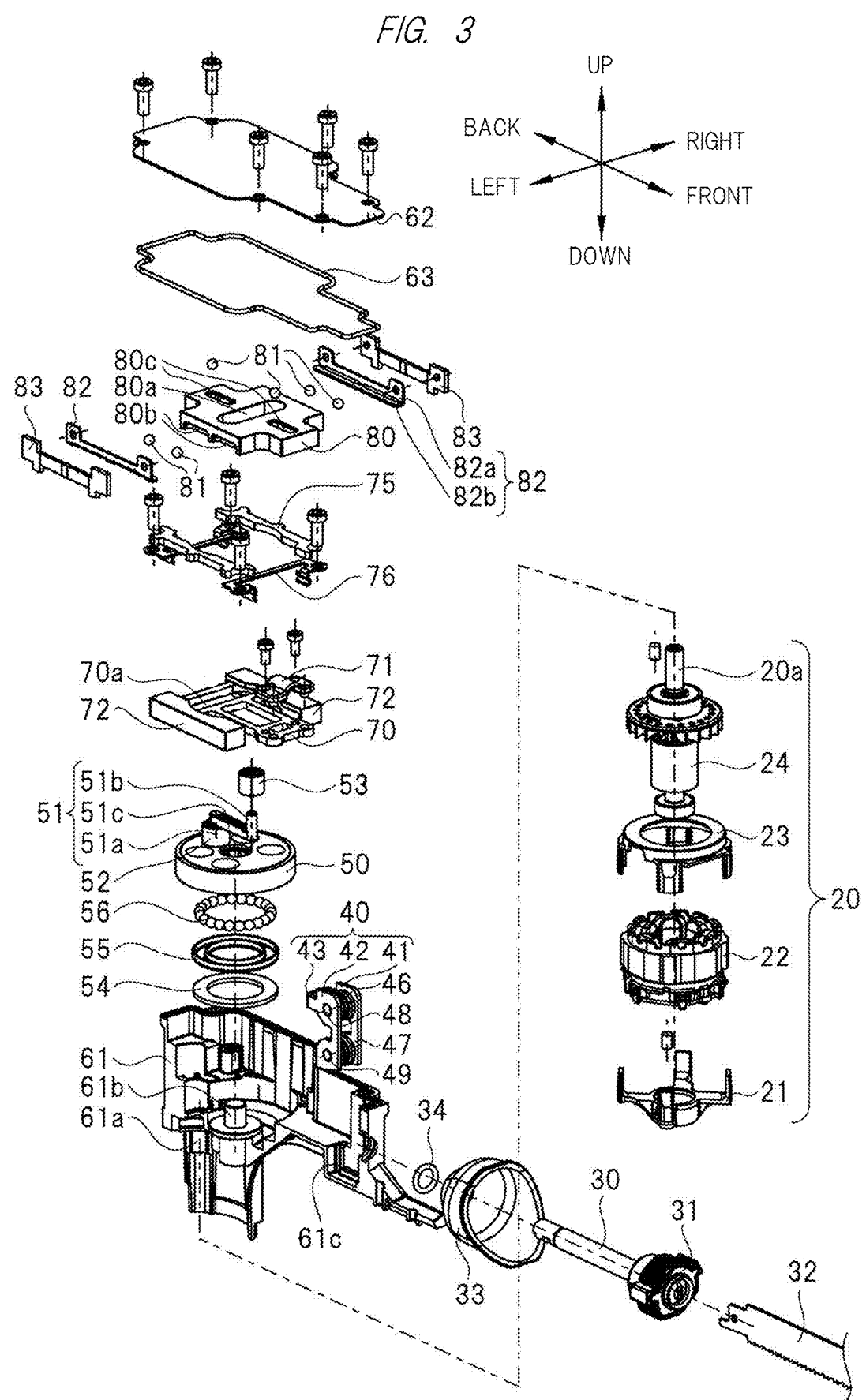
FIG. 3 is an exploded perspective view of a transmission mechanism.

The holder 40 includes, as shown in FIG. 3, a right member 41, a left member 42, and a coupling member 43 that couples the right member 41 and the left member 42 together. Since the holder 40 is configured by integrating the right member 41, the left member 42, and the coupling member 43 as a single member, manufacturing cost of the holder 40 can be reduced. The holder 40 is made of metal. Returning to FIG. 2 the lower surface of the holder 40 abuts against the abutment surface 61c of the transmission mechanism accommodation portion 61. The upper surface of the holder 40 abuts against the lower surface of the lid portion 62.

A blade holder 31 is provided on a front side of the plunger 30. The blade holder 31 is a tool grip portion. A blade 32 is held by the blade holder 31. The blade 32 is one example of a tool, and is a saw blade in the present embodiment. The blade 32 reciprocates in the front-back direction together with the plunger 30 to cut the object.

A dust guard 33 is provided in front of the gear case 60. An O-ring 34 is provided in the front portion of the gear case 60. The dust guard 33 and the O-ring 34 can prevent chips and the like generated by cutting the object from entering an inside of the gear case 60.

A motor 20 is accommodated in the motor accommodation portion 13. The motor 20 includes a stator 22, a rotor 24, a motor shaft 20a, and the like.

The gear case 60 accommodates a gear 50 and a connector 70. The gear 50 is formed into a disc shape. The gear 50 is made of metal. The gear 50 is supported by a center shaft 61b in the transmission mechanism accommodation portion 61. A damper 54 and a thrust washer 55 are arranged between the gear 50 and the transmission mechanism accommodation portion 61. A large number of steel balls 56 are rotatably arranged in the thrust washer 55. The steel balls 56 abut against a lower surface of gear 50. The gear 50 is rotatable on the steel balls 56 around the center shaft 61b.

A crankshaft 51 is provided so as to protrude from an upper surface of the gear 50. As shown in FIG. 3, the crankshaft 51 has a first eccentric shaft 51a on one end side, a second eccentric shaft 51b on the other end side, and a coupling rod 51c connecting the first eccentric shaft 51a and the second eccentric shaft 51b. The first eccentric shaft 51a is eccentric from the center axis 61b. A lower end of the first eccentric shaft 51a is embedded and fixed into and to the gear 50. The second eccentric shaft 51b is eccentric from the center shaft 61b and the first eccentric shaft 51a. The second eccentric shaft 51b is floating from an upper surface of the gear 50.

A needle bearing 52 is attached to the first eccentric shaft 51a. The needle bearing 52 is rotatable with respect to the first eccentric shaft 51a. A sleeve 53 is attached to the second eccentric shaft 51b. The sleeve 53 is rotatable with respect to the second eccentric shaft 51b. The crankshaft 51 corresponds to a rotating body of the present invention. The second eccentric shaft 51b corresponds to an eccentric portion of the invention.

A connector 70 is provided on the gear 50. The connector 70 is made of metal. A long hole 70a extending in the right-left direction is formed in a center of the connector 70. A needle bearing 52 is engaged with the long hole 70a, and the needle bearing 52 slides in the long hole 70a.

A plunger sleeve 71 is attached to a front portion of the connector 70. A back end of the plunger 30 is fixed to plunger sleeve 71 by the plunger 30. Left and right side surfaces of the connector 70 are supported by slide bearings 72.

The first eccentric shaft 51a is connected to the plunger 30 via the needle bearing 52 and the connector 70. The connector 70 is reciprocable in the front-back direction together with the plunger 30.

The gear 50, crankshaft 51, and connector 70 are one example of a transmission mechanism. The transmission mechanism converts a rotation driving force of the motor 20 into a reciprocation driving force to transmit it to the plunger 30. The gear case 60 is one example of a transmission mechanism case. The transmission mechanism case accommodates the transmission mechanism. The transmission mechanism accommodation portion 61 is one example of a first case. The lid portion 62 is one example of a second case.

A spacer 75 is provided on the connector 70. The spacer 75 is stationary. A counterweight 80 is provided on the spacer 75. The counterweight 80 is driven by drive of the motor 20 so as to cancel vibration caused by reciprocation of the plunger 30. The counterweight 80 is made of metal. A long hole 80a extending in the right-left direction is formed in the center of the counterweight 80. A sleeve 53 is engaged with the long hole 80a, and the sleeve 53 slides in the long hole 80a.

A plurality of groove portions are formed in the counterweight 80. More specifically, side surface grooves 80b and upper surface grooves 80c are formed in the counterweight 80. A steel ball 81 is arranged inside the side surface groove 80b and the upper surface groove 80c. The steel ball 81 is one example of a rolling element.

The side surface grooves 80b are formed on both left and right side surfaces of the counterweight 80. More specifically, the side surface grooves 80b are formed at two locations, a front side and a back side of a left side surface. Although not shown, the side surface grooves 80b are also formed at two locations, a front side and a back side of the right side surface. That is, the side surface grooves 80b are provided at four locations on the side surface of the counterweight 80. Further, a steel ball 81 is inserted into each side surface groove 80b. The steel ball 81 inserted into each side surface groove 80b can roll in the side surface groove 80b.

The upper surface groove 80c is formed in the upper surface of the counterweight 80. More specifically, the upper surface grooves 80c are formed at two locations, the front side and the back side. A steel ball 81 is inserted into each upper surface groove 80c. The steel ball 81 inserted into each upper surface groove 80c can roll within the upper surface groove 80c.

Weight guides 82 and dampers 83 are arranged on both left and right side surfaces of the counterweight 80. The weight guide 82 and the damper 83 are attached to the transmission mechanism accommodation portion 61 and are immovable. The weight guide 82 and damper 83 are one example of a slide support portion. The slide support portion elastically supports the counterweight 80 so as to be slidable. The damper 83 is one example of an elastic body. The damper 83 of the present embodiment is made of rubber. A protrusion is formed on the damper 83, and by the protrusion bring inserted into a hole of the weight guide 82, the weight guide 82 and the damper 83 are prevented from deviating in the front-back direction.

The second eccentric shaft 51b is engaged with the counterweight 80 via the sleeve 53. The gear 50, crankshaft 51, and connector 70, each of which is one example of the transmission mechanism, convert the rotation driving force of the motor 20 into the reciprocation driving force of the counterweight 80 and transmit it to the counterweight 80.

With reference to FIG. 3, an assembly state of each member with respect to the gear case configured by the transmission mechanism accommodation portion 61 and the lid portion 62 will be described. Each member is sequentially arranged upward from a bottom of the transmission mechanism accommodation portion 61 and is assembled to the gear case by being covered with the lid portion 62.

First, the motor 20 configured by a motor holder 21, a stator 22, a fan guide 23, and a rotor 24. A motor shaft 20a of the motor 20 is inserted into a motor shaft hole 61a provided in the transmission mechanism accommodation portion 61.

A damper 54 and a thrust washer 55 are arranged in the transmission mechanism accommodation portion 61, and a large number of steel balls 56 are arranged inside the thrust washer 55. The gear 50 is arranged on the steel balls 56, and a center shaft 61b provided in the transmission mechanism accommodation portion 61 is inserted into the center of the gear 50. The motor shaft 20a abuts against a side surface of the gear 50. The gravity center G of the working machine 10 is positioned behind the center axis 61b. The gravity center G is positioned below the plunger 30.

A connector 70 attaching a plain bearing 72 is arranged on the gear 50. The second eccentric shaft 51b and the connection rod 51c in the crankshaft 51 provided so as to protrude from the upper surface of the gear 50 protrude above the connector 70 through an elongated hole 70a formed in the connector 70. The first eccentric shaft 51a in the crankshaft 51 is positioned in the long hole 70a, and a needle bearing 52 attached to the first eccentric shaft 51a is engaged with the long hole 70a.

A first shaft 48 and a second shaft 49 are inserted through the holder 40, and a first roller 46 and a second roller 47 are rotatably supported by the first shaft 48 and the second shaft 49. The holder 40 is arranged inside the transmission mechanism accommodation portion 61, and the lower surface of the holder 40 abuts against the contact surface 61c of the transmission mechanism accommodation portion 61.

The plunger 30 is inserted through the dust guard 33 and the O-ring 34 and is inserted through the transmission mechanism accommodation portion 61. The plunger 30 is inserted between the first roller 46 and the second roller 47. The plunger 30 is secured to the connector 70 by a plunger sleeve 71.

A metal plate 76 and a spacer 75 are arranged on the connector 70. The connection rod 51c in the crankshaft 51 provided so as to protrude from the upper surface of the gear 50 is positioned at the same height as that of the spacer 75, and the second eccentric shaft 51b protrudes above the spacer 75. By the metal plate 76, the plain bearing 72 is supported so as not to move upward.

Left and right weight guides 82 and dampers 83 are arranged on the spacer 75. The weight guide 82 is a member obtained by bending a plate-like member into an L-shaped cross-section. The weight guide 82 has a vertical wall portion 82a that extends in the right-left direction (and in the front-back direction) and a horizontal wall portion 82b that extends in the right-left direction (and in the front-back direction). Two steel balls 81 are arranged in the left weight guide 82, and two steel balls 81 are arranged in the right weight guide 82 as well. The steel ball 81 arranged in the weight guide 82 abuts against each of the vertical wall portion 82a and the horizontal wall portion 82b. A counterweight 80 is arranged between the left and right weight guides 82. Consequently, the four steel balls 81 arranged on the left and right weight guides 82 become such a state as to be arranged in side grooves 80b formed at four locations of the counterweight 80. The sleeve 53 attached to the second eccentric shaft 51b is engaged with the long hole 80a. The two steel balls 81 are inserted into the two upper surface grooves 80c formed in the counterweight 80.

A packing 63 and a lid portion 62 are arranged on the transmission mechanism accommodation portion 61, and the lid portion 62 is screwed to the transmission mechanism accommodation portion 61, thereby closing the gear case 60 as shown in FIG. 2. The lower surface of the lid portion 62 abuts against the upper surface of the holder 40 and abuts against the steel ball 81 inserted into the upper surface groove 80c.

The reciprocating motion of the plunger 30 and the counterweight 80 driven by the motor 20 will be described. When the motor 20 operates, the gear 50 abutting against the motor shaft 20a rotates about the center axis 61b and the crankshaft 51 protruding from the gear 50 also rotates about the center axis 61b.

When the crankshaft 51 rotates, the first eccentric shaft 51a revolves around the center axis 61b and the needle bearing 52 attached to the first eccentric shaft 51a also revolves around the center axis 61b. Furthermore, when the needle bearing 52 revolves, the needle bearing 52 moves while rotating in the long hole 70a. As a result, the connector 70 is reciprocated in the front-back direction and the plunger 30 connected to the connector 70 is reciprocated in the front-back direction.

When the crankshaft 51 rotates, the second eccentric shaft 51b also revolves around the center axis 61b and the sleeve 53 attached to the second eccentric shaft 51b also revolves around the central axis 61b. Further, when the sleeve 53 revolves, the sleeve 53 moves while rotating in the long hole 80a. As a result, the counterweight 80 is reciprocated in the front-back direction.

In this embodiment, the first eccentric shaft 51a and the second eccentric shaft 51b provided at both ends of the connection rod 51c are arranged at positions different from each other by 180 degrees around the center axis 61b. Therefore, when the plunger 30 moves forward, the counterweight 80 moves backward and when the plunger 30 moves backward, the counterweight 80 moves forward. That is, the plunger 30 and the counterweight 80 operate in opposite phases.

An inclination of the counterweight 80 during an operation will be described with reference to FIGS. and 5. Note that although the inclination of the counterweight 80 is actually slight, it is exaggerated in both figures.

Figure 4:
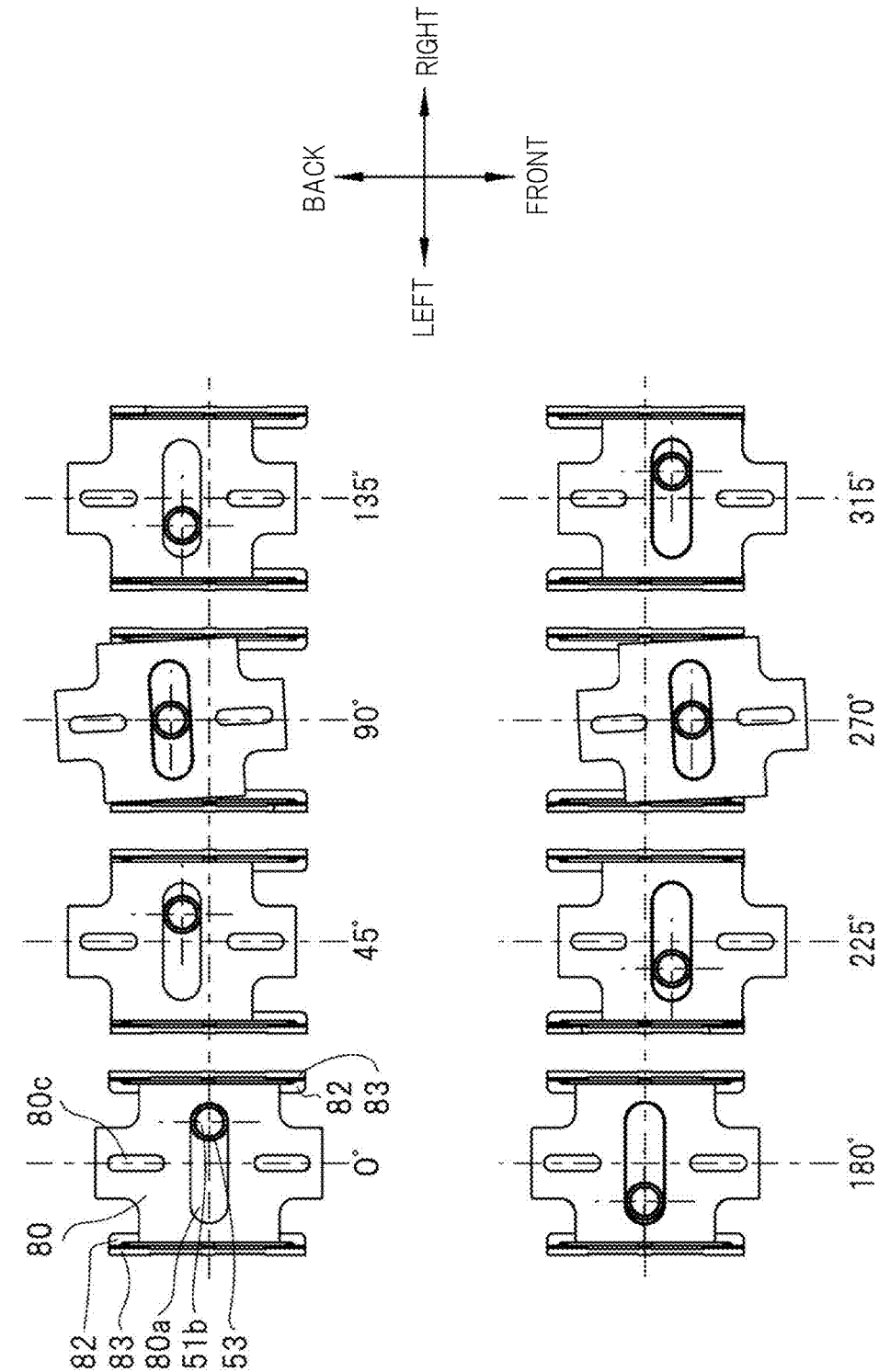
FIG. 4 is a top view showing an inclination of a right-left direction of the counterweight.

FIG. 4 is a plan view showing a right-left directional inclination of the counterweight 80 in the horizontal direction. The counterweight 80 is reciprocated in the front-back direction by the crankshaft 51 together with the gear 50 rotating counterclockwise and by the sleeve 53, which is attached to the second eccentric shaft 51b, moving within the long hole 80a.

When the second eccentric shaft 51b is at a position of 0° (the right end of the elongated hole 80a), the counterweight 80 is in a neutral state with no right-left directional inclination.

When the second eccentric shaft 51b rotates counterclockwise from the position of 0°, passes through a position of 45°, and reaches a position of 90° (the center of the long hole 80a), the counterweight 80 is pushed by the rotating second eccentric shaft 51b rotated in a counterclockwise direction and tilts slightly in the counterclockwise direction.

When the second eccentric shaft 51b rotates counterclockwise from a position of 90°, passes through a position of 135°, and reaches a position of 180° (the left end of the long hole 80a), the counterweight 80 returns to the neuter position.

When the second eccentric shaft 51b rotates counterclockwise from the position of 180°, passes through a position of 225°, and reaches a position of 270° (the center of the long hole 80a), the counterweight 80 is pushed by the rotating second eccentric shaft 51b rotated in the counterclockwise direction and slightly tilts in the counterclockwise direction.

When the second eccentric shaft 51b rotates counterclockwise from the position of 270°, passes through a position of 315°, and reaches a position of) 360° (0°, the counterweight 80 returns to the neuter position.

When the second eccentric shaft 51b reaches the position of 90° and the position of 270°, the counterweight 80 slightly tilts in the counterclockwise direction. This is because a force in the front-back direction is received at a location offset in the right-left direction from the center of the counterweight 80.

Conventionally, vibration occurs when the force of the counterweight 80 that tends to tilt is transmitted to the gear case 60 or when the tilted counterweight 80 contacts with the gear case 60 directly or indirectly in the right-left direction.

However, in the present embodiment, the counterweight 80 can move (tilt) in the right-left direction, the dampers 83 are further arranged on both the left and right sides of the counterweight 80, and the vibration is absorbed by the dampers 83, so that the vibration due to the operation of the counterweight 80 is suppressed.

Figure 5:
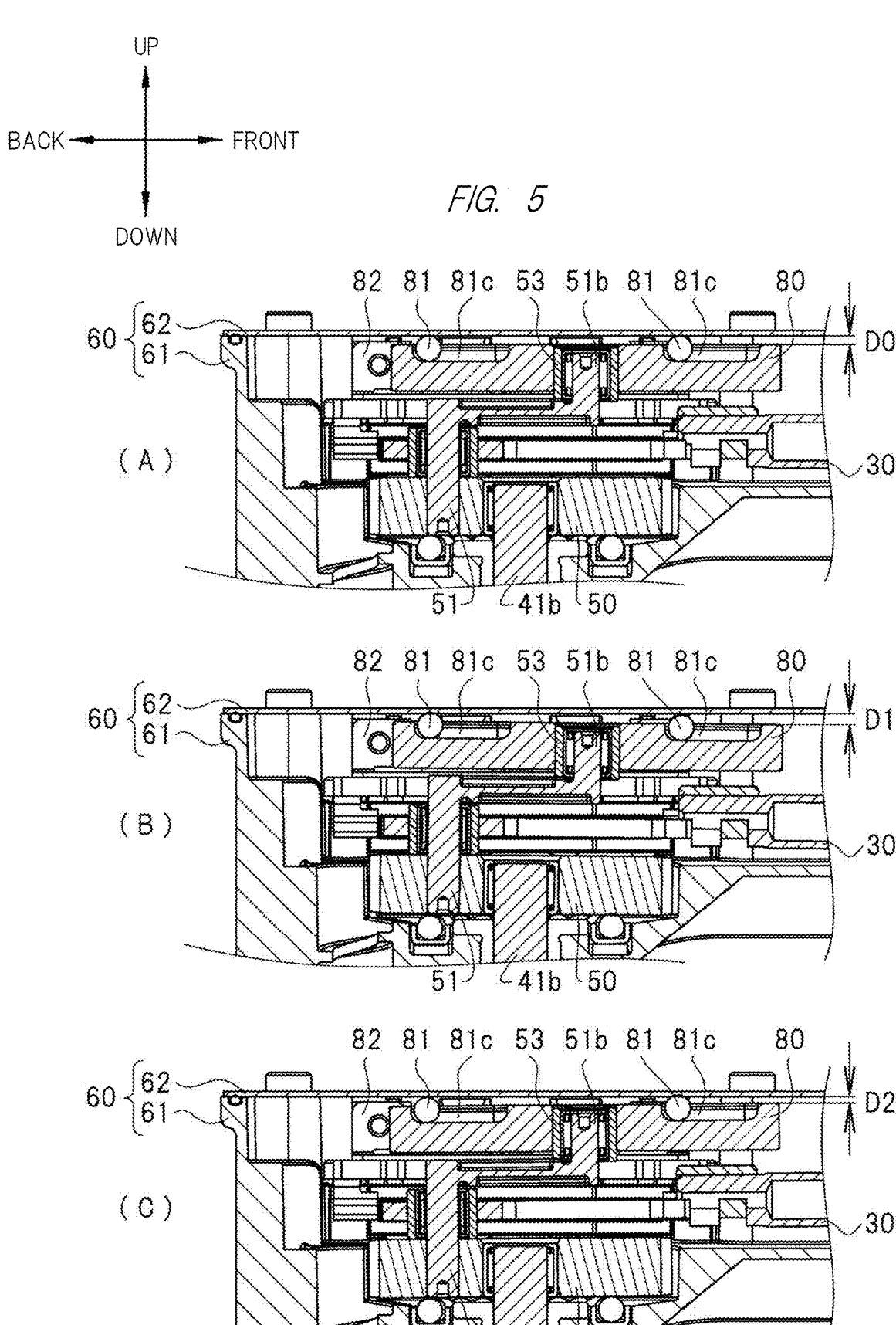
FIG. 5 is a cross-sectional left-side view showing an inclination of the counterweight in a front-back direction.

FIG. 5 is a cross-sectional left side surface view showing an inclination of the counterweight 80 in the front-back direction. During an operation, the gear 50 receives a reaction force from an object and tilts slightly in the front-back direction about the center axis 61b. When the gear 50 tilts, the counterweight 80 engaged with the crankshaft 51 and the sleeve 53 also tilts slightly in the front-back direction about the center axis 61b.

FIG. 5(A) shows a normal state in which the counterweight 80 is not tilted in the front-back direction. A distance D between the lower surface of the lid portion 62 and a front-end upper surface of the counterweight 80 in this state is assumed to be D0. FIG. 5(B) shows a state in which the counterweight 80 is tilted forward. The distance D in this state is D1. FIG. 5(C) shows a state in which the counterweight 80 is tilted backward. The distance D in this state is D2. The distance D satisfies D1<D0<D2.

When the counterweight 80 tilts, the steel balls 81 arranged in the upper surface grooves 80c also move slightly in the up-down direction and vibration is generated by this movement. However, in the present embodiment, the cover portion 62 is made of thin-plate-shape metal and has flexibility, so that flexure of the cover portion 62 absorbs the movement of the steel ball 81 in the up-down direction, which suppresses the vibration due to the operation of the counterweight 80.

As described above, the counterweight 80 is elastically supported by the damper 83 in a direction perpendicular to the front-back direction, that is, in the right-left direction, and is elastically supported by the lid portion 62 of the gear case 60 in the up-down direction. Consequently, the damper 83 absorbs the vibration generated in the right-left direction due to the operation of the counterweight 80. Furthermore, the vibration generated in the up-down direction is absorbed by the flexure of the lid portion 62. Therefore, the left-right and up-down directional movement (tilting) of the counterweight 80 is buffered, so that the vibration and noise caused by this are suppressed.

In addition, when the plunger 30 reciprocates, large vibration occurs in the front-back direction, but as a reaction of the operation, movement (fluctuation) of rotation about a right-left directional axis (virtual axis) passing through the gravity center G occurs. In the present embodiment, the gravity center G is located below the plunger 30 and the counterweight 80 is located above the plunger 30, so that even if a light counterweight is used, up-down directional swing as described above can effectively be damped. As a result, in addition to the vibration reduction, intermittently application of the up-down directional load to the support member (first roller 46 and second roller 47) for supporting the plunger 30 can be suppressed, so that the life improvement of the support members can be achieved. The invention relating to such a positional relationship between the plunger 30 and the counterweight 80 with respect to the gravity center is a separate invention from the elastic support mechanism for the counterweight 80.

[Modification Example] The present invention is not limited to the above-described embodiments, and various modifications can be made without departing from the scope of the invention.

In the above embodiment, an example in which the counterweight 80 is driven by antiphase with respect to that of the plunger 30 has been described, but the counterweight 80 may be opened, for example, by shifting several degrees from the antiphase. That is, the counterweight 80 may be driven so as to cancel the vibration caused by the reciprocating motion of the plunger 30.

In the above embodiment, an example in which the counterweight 80 is elastically supported in the right-left direction by the dampers 83 located on both sides has been described, but elastic support may be provided only on the left side or the right side. Further, although the counterweight 80 is configured so as to be elastically supported by the damper 83 via the weight guide 82, the weight guide 82 may be omitted and the counterweight 80 may be configured so as to be slidably supported directly by the elastic body. For example, the weight guide 82 may be provided with a plate-spring-shaped portion that elastically deforms in the right-left direction, and the counterweight 80 may be directly supported by the plate-spring-shaped portion. In this case, since frictional heat with the elastic body is generated, there is a concern that durability may decrease due to the heat, but there is an advantage in that the number of parts can be reduced. Further, when the weight guide 82 is provided with a plate-spring-shaped portion, it may be provided on either or both of the inner surface and the outer surface. When the plate-spring-shaped portion is provided on the outer surface, there is an advantage that the elastic deformation portion and the counterweight 80 do not directly contact with each other. Also, although the damper 83 is configured to be supported by the gear case 60 (the transmission mechanism accommodation portion 61), it may be configured to be supported by the counterweight 80. That is, the counterweight 80 and the elastic body may be configured to reciprocate integrally. For example, a groove may be provided in the left-right direction of the counterweight 80 and a linear elastic body may be embedded in the groove, and the vibration absorption in the right-left direction may be attempted by embedding an O-ring (annular elastic body) into the side surfaces in the front-back direction and the right-left direction. In addition, the counterweight itself may be configured to have an elastic portion. That is, an elastically deformable portion may be provided in a single member called the counterweight.

In the above-described embodiments, an example in which the upper side cover portion 62 elastically supports the counterweight 80 in the up-down direction has been described. However, such elastic support may be made directly or indirectly via a spring and the like by the lower side transmission mechanism accommodation portion 61. Also, the elastic support may be made on both the upper and lower sides.

In the above-described embodiments, an example in which the damper 83 is made of rubber has been described, but the damper 83 may be an elastic body including any one of rubber, urethane, sponge, and spring. The spring may be a metal plate spring, spring, disc spring, or the like.

In the above-described embodiments, an example in which the rolling elements arranged inside the side surface groove 80b and the upper surface groove 80c of the counterweight 80 are the steel balls 81 (spherical) has been made, but the rolling element may be, for example, a roller (column).

In the above-described embodiments, an example in which the counterweight 80 is driven by the operation of the crankshaft 51 has been described, but the counterweight 80 may be driven by a configuration other than the crankshaft 51, for example, a configuration in which an eccentric pin is attached directly to a gear rotating by regarding an up-down direction as an axis, and a mechanism of the elastic support is applicable also to such a case.

DESCRIPTION OF SYMBOLS

10 . . . Working machine; 20 . . . Motor; 30 . . . Plunger; 40 . . . Holder; 46 . . . First roller; 47 . . . Second roller; 48 . . . First shaft; 49 . . . Second shaft; 50 . . . Gear; 51 . . . Crankshaft; 51a . . . First eccentric shaft; 51b . . . Second eccentric shaft; 51c . . . Connecting rod; 52 . . . Needle bearing; 53 . . . Sleeve; 60 . . . Gear case; 61 . . . Transmission mechanism accommodation portion; 62 . . . Lid portion; 70 . . . Connector 70a . . . Long hole; 80 . . . Counterweight; 80a . . . Long hole; 80b . . . Side surface groove; 80c . . . Upper surface groove; 81 . . . Steel ball; 82 . . . Weight guide; and 83 . . . Damper.

The invention claimed is:

1. A working machine comprising:
a motor;
a plunger that can attach a tool and reciprocates in a front-back direction by a drive of the motor;
a rotating body that rotates around an axis extending in an up-down direction by the drive of the motor;
an eccentric portion provided on the rotating body to be offset from the axis and configured to rotate around the axis;
a counterweight that is connected to the eccentric portion and reciprocates in the front-back direction so as to counteract vibration due to the reciprocation of the plunger by transmitting a forward biasing force from a forward movement of the eccentric portion to the counterweight and by transmitting a rearward biasing force from a rearward movement of the eccentric portion to the counterweight; and
an elastic body that is arranged on at least one side of the counterweight in a right-left direction and elastically supports the counterweight in the right-left direction.

2. The working machine according to claim 1, wherein the counterweight is elastically supported in the up-down direction.

3. The working machine according to claim 1, wherein the rotating body has an eccentric portion, the counterweight is provided with an elongated hole extending in the right-left direction, and power from the eccentric portion inserted through the elongated hole is transmitted to the counterweight.

4. The working machine according to claim 1, wherein the counterweight is elastically supported via a rolling element.

5. The working machine according to claim 1, wherein the elastic body is arranged on both left and right sides of the counterweight.

6. The working machine according to claim 1, wherein a gravity center is positioned on a side opposite the counterweight with respect to the plunger.

7. The working machine according to claim 6, wherein the plunger is supported by two rollers respectively positioned above and below so as to be movable in the front-back direction.

8. The working machine according to claim 1, further comprising a transmission mechanism case that accommodates the rotating body,
wherein the transmission mechanism case accommodates the elastic body and a metal support member,
the metal support member is supported on the transmission mechanism case via the elastic body, and the counterweight is supported by the metal support member that is elastically supported by the elastic body and is configured to reciprocate in the front-back direction relative to the metal support member.

9. The working machine of claim 1, wherein the plunger and the counterweight are reciprocated with a predetermined phase difference.

10. The working machine of claim 1, wherein the eccentric portion comprises:
a first eccentric portion that drives the plunger; and
a second eccentric portion that drives the counterweight, wherein each of the first eccentric portion and the second eccentric portion rotates around the axis.

11. The working machine of claim 1, wherein the counterweight has an elongated hole that extends in the right-left direction and passes through in the up-down direction, and
the counterweight is driven by the eccentric portion transmitting a driving force to an inner surface of the elongated hole of the counterweight.

12. The working machine of claim 11, wherein the elastic body absorbs vibrations generated when the eccentric portion transmits the driving force to the elongated hole and the counterweight tilts around an up-down axis.

13. A working machine comprising:
a motor;
a plunger that can attach a tool and reciprocates in a front-back direction by a drive of the motor;
a counterweight that is driven so as to counteract vibration due to the reciprocation of the plunger by the drive of the motor; and
a transmission mechanism that transmits a rotation driving force of the motor to the plunger and the counterweight; and
a transmission mechanism case that accommodates the transmission mechanism, an elastic body, and a metal support member,
wherein the metal support member is supported by the transmission mechanism case via the elastic body,
wherein the elastic body and the metal support member are arranged on at least one side of the counterweight in a direction orthogonal to the front-back direction, and
wherein the counterweight is supported by the metal support member that is elastically supported by the elastic body and is reciprocable relative to the metal support member in the front-back direction.

14. The working machine according to claim 13, wherein the counterweight is configured to reciprocate in the front-back direction by a rotating body that rotates around an axis extending in an up-down direction by the drive by the motor, and
the counterweight is elastically supported in a right-left direction by the elastic body.

15. The working machine according to claim 13, wherein the elastic body includes any one of rubber, urethane, sponge, and spring.

16. The working machine according to claim 13, further comprising a transmission mechanism,
wherein the transmission mechanism has a gear that is driven so as to rotate around an axis extending in an up-down direction by the drive of the motor, and a crankshaft that rotates together with the gear,
one end of the crankshaft is eccentric from the axis and is coupled to the plunger,
the direction orthogonal to the front-back direction is a right-left direction,
the other end of the crankshaft is eccentric from the axis and is engaged with the counterweight, and
the plunger and the counterweight are driven by movement of the crankshaft.

17. The working machine according to claim 16, further comprising a transmission mechanism case,
wherein the counterweight has a plurality of groove portions,
a rolling element is arranged inside the groove portions,
the transmission mechanism case has a flexible plate-shaped lid portion, and
the lid portion abuts against the rolling element.

18. The working machine of claim 13, wherein the elastic body is rubber having a thickness in a right-left direction, and
the metal support member is arranged so as not to shift relative to the elastic body in the front-back direction.

19. A working machine comprising:
a motor;
a plunger that can attach a tool and reciprocates in a first direction by the motor;
a rotating body that rotates around an axis extending in a second direction orthogonal to the first direction by a drive of the motor;
an eccentric portion provided on the rotating body and configured to rotate around the axis;
a counterweight that is connected to the eccentric portion and reciprocates in the first direction so as to counteract vibration due to the reciprocation of the plunger by transmitting a forward biasing force from a forward movement of the eccentric portion to the counterweight and by transmitting a rearward biasing force from a rearward movement of the eccentric portion to the counterweight; and
an elastic body arranged on at least one side of the counterweight in a third direction that is orthogonal to both the first direction and the second direction and elastically supports the counterweight in the third direction.

20. The working machine of claim 1, wherein the counterweight is rotatable about the up-down direction, and the elastic body is compressed by rotation of the counterweight about up-down direction.

* * * * *